United States Patent [19]
Marin

[11] Patent Number: 6,155,001
[45] Date of Patent: Dec. 5, 2000

[54] CARRIER FOR ICE FISHING TRAPS

[76] Inventor: Phillip Marin, P.O. Box 331, Dixfield, Me. 04224

[21] Appl. No.: 09/318,995

[22] Filed: May 26, 1999

Related U.S. Application Data

[60] Provisional application No. 60/086,714, May 26, 1998.

[51] Int. Cl.⁷ ................................................ A01K 97/01
[52] U.S. Cl. ................................................. 43/54.1; 43/26
[58] Field of Search ........................... 43/54.1, 26, 21.2; 206/315.11, 372, 373; 224/922, 916, 604, 247, 609; 383/38–40; 211/70.8; 294/159

[56] References Cited

U.S. PATENT DOCUMENTS

| | | |
|---|---|---|
| D. 389,306 | 1/1998 | MacPherson . |
| 847,254 | 3/1907 | Jackson . |
| 2,419,175 | 4/1947 | Spohrer . |
| 2,536,797 | 1/1951 | Cooke . |
| 2,791,255 | 5/1957 | Ogden .................................... 294/143 |
| 2,854,775 | 10/1958 | Kleckley ..................................... 43/26 |
| 2,899,997 | 8/1959 | Rauen . |
| 2,908,308 | 10/1959 | Dearholt . |
| 3,465,928 | 9/1969 | Osterholm ............................... 224/629 |
| 3,575,327 | 4/1971 | Harrison ................................. 294/149 |
| 3,678,611 | 7/1972 | Files ........................................... 43/26 |
| 4,628,628 | 12/1986 | Burgin et al. ............................... 43/26 |
| 4,662,517 | 5/1987 | Wirth ...................................... 206/388 |
| 4,726,141 | 2/1988 | McBride et al. ........................... 43/26 |
| 5,040,324 | 8/1991 | Rivera et al. . |
| 5,071,048 | 12/1991 | Price et al. .............................. 224/604 |
| 5,104,017 | 4/1992 | Vandagriff ............................... 224/609 |
| 5,294,163 | 3/1994 | Lang . |
| 5,303,500 | 4/1994 | Luukonen . |
| 5,327,669 | 7/1994 | Lannan et al. ............................. 43/26 |
| 5,383,587 | 1/1995 | Carpenter . |
| 5,678,348 | 10/1997 | Zielinski et al. ........................... 43/26 |
| 5,730,287 | 3/1998 | Martin ................................. 206/315.9 |
| 5,730,529 | 3/1998 | Fritz et al. ................................. 383/4 |
| 5,836,103 | 11/1998 | Taylor . |

FOREIGN PATENT DOCUMENTS

| | | |
|---|---|---|
| 3517393 | 11/1985 | Germany . |
| 3626574 | 2/1988 | Germany . |
| 2051564 | 1/1981 | United Kingdom . |
| 2226948 | 7/1990 | United Kingdom . |

*Primary Examiner*—Michael J. Carone
*Assistant Examiner*—Son T. Nguyen
*Attorney, Agent, or Firm*—Thomas L. Bohan; Patricia M. Mathers

[57] ABSTRACT

A device allowing a person to carry a plurality of ice fishing traps. The device has two end pieces connected to each other by a plurality of sizing straps. Each end piece has a number of pockets capable of receiving the end of an ice fishing trap. The pockets on the respective end pieces are aligned so as to receive opposite ends of a trap. The device is then rolled in a direction perpendicular to the longitudinal axis of the traps to form a cylindrical shape. Fastening means located on the outer surface of each end piece prevent the cylindrical shape from unrolling. A detachable shoulder strap enables the user to carry the device by slinging it over his/her shoulder, thereby leaving the hands free to perform other tasks.

15 Claims, 5 Drawing Sheets

6,155,001

CARRIER FOR ICE FISHING TRAPS

CROSS-REFERENCE TO RELATED PROVISIONAL APPLICATION

This application claims the benefit of U.S., Provisional Application Ser. No. 60/086,714, filed on May 26, 1998.

BACKGROUND OF THE INVENTION

1. Field of the Invention

This invention relates to equipment used for ice fishing. Particularly, the present invention relates to an improved means of transporting and storing traps used in ice fishing. More particularly, the present invention involves a device that allows an ice fisherman to carry a number of traps on foot while keeping his/her hands free for other tasks.

2. Description of the Prior Art

Ice fishing generally requires the setting of a number of "traps" at various holes made in the ice by the ice fisherman. In order to avoid prolonged exposure to the elements, it is desirable for the fisherman to be able to transport more than a single trap at once. The danger of falling through the ice often precludes the use of a vehicle in moving traps, and the fisherman must frequently transport traps and other fishing paraphernalia by foot. To minimize the number of trips required, some means for carrying a number of traps at once while allowing the fisherman's hands to remain free is therefore desirable. To avoid user fatigue due to the extreme conditions often encountered while ice fishing, such a device should be both lightweight and flexible.

The ice fishing traps themselves generally consist of a pair of wooden sticks to which a spool for fishing line and a signal flag are attached. The wooden sticks are pivotally connected and may vary in length from one trap to another. Both flag and spool are subject to damage from dropping or striking other objects during transport. Moreover, having been left out in the elements, the traps are usually wet when transported, or may have to be retrieved in foul weather. Following transport, traps are frequently stored for prolonged periods of time. If the storage container retains water, certain components of the traps are susceptible to either rotting or corrosion during storage. If no container is used for storage, the traps tend to become entangled with each other. It is therefore desirable to construct any trap carrier from material that will dry quickly, and of such design as to prevent the wet traps from coming into contact with other objects as well as with each other.

The types of existing devices for carrying a plurality of ice fishing traps is limited. One such prior-art device has the traps gathered into a container, such as a basket or box. Such an arrangement, among other drawbacks, has the disadvantage of requiring two hands to carry the load. Moreover, since the containers used for transport are usually used for long-term trap storage as well, this class of prior-art containers has the additional drawback of increasing the likelihood of damage to the traps caused by corrosive attack or mutual entanglement.

The compactness of an empty trap carrier is an additional consideration. Once the ice fishing traps are deployed, the fisherman may store the carrier in a container, ice fishing shanty, or vehicle. An empty trap that is bulky or cannot be easily broken down or reduced in size makes such storage difficult. The rigid construction of prior-art trap carriers does not lend itself to compact storage when the carrier is not in use.

A hand-held carrier disclosed by Lang (U.S. Pat. No. 5,294,163, issued in 1994) calls for the ice fishing traps to be placed in aligned slots cut into two rigid side supports that are held together by a rigid base and connected to a handle. The device of Lang is cumbersome, requiring the fisherman to use his hands, and, furthermore, cannot easily accommodate traps of varying sizes.

An ice fishing device disclosed by Luukonen (U.S. Pat. No. 5,303,500, issued in 1994) includes a bucket which holds a removable tray having a pocket for fishing rods and other equipment. The Luukonen device also suffers from the disadvantage of having to be carried by hand.

Another prior-art device for carrying ice fishing traps disclosed by McPherson (U.S. Design Pat. No. 389,306, issued in 1998) uses a case that is of solid construction and is carried by means of a handle, again requiring the ice fisherman to use at least one hand to carry the traps. Furthermore, the use of a solid case adds unnecessary weight. Placing the traps in a solid container also prevents them from drying during subsequent storage, resulting in likely corrosion of metal parts as well.

Strap assemblies for carrying fishing rods are taught by Miller (U.S. Pat. No. 4,529,112, issued in 1985), and Rivera et al. (U.S. Pat. No. 5,040,324, issued in 1991). These devices allow a fishing rod (or rods) to be slung over the shoulder, but make no provision for either preventing the fishing rods from becoming entangled or protecting the ends of the rods from damage. The carrier described by Taylor (U.S. Pat. No. 5,836,103, issued in 1998) provides a means to prevent entanglement during transport and storage combined with a tackle box having a handle. Other fishing rod carriers, such as described by Zielinski et al. (U.S. Pat. No. 5,678,348, issued in 1997), and Price et al. (U.S. Pat. No. 5,071,048, issued in 1991), use rigid members to separate rods from each other, the rigid members being connected to each other by a carrying strap. While these fishing rod carriers contain some of the features lacking in the prior-art carriers of ice fishing traps, such devices are impractical for carrying ice fishing traps, which are generally heavier, thicker, and shorter than fishing rods.

Therefore, what is needed is a lightweight, flexible carrier for ice fishing traps that a allows a multiplicity of ice fishing traps to be carried concurrently by a person on foot. In addition, what is needed is a carrier that allows the person's hands to be free for other tasks. What is also needed is such a trap carrier which, once exposed to water, will dry quickly. Furthermore, what is also needed is such a device that will prevent damage to the traps during transport or storage. What is yet further needed is a carrier for ice fishing traps that can be easily stored in compact form when not in use. In addition, what is needed is a trap carrier that will be able to accommodate traps of various lengths. Finally, what is needed is such an ice fishing trap carrier that permits neat, organized storage of ice fishing traps.

SUMMARY OF THE INVENTION

It is an object of the present invention to provide a lightweight, flexible device that will permit a ice fisherman to carry a number of ice fishing traps concurrently on foot while leaving both hands free for other tasks. It is another object of the invention to provide a trap carrier which, once exposed to water, will dry quickly. It is yet another object of the invention to provide a carrier for ice fishing traps that can be easily and compactly stored when not in use. It is also an object of the present invention to provide such a trap carrier that can accommodate ice fishing traps of different sizes. It is a further object of the invention to provide a device that will prevent damage to traps during transport or storage.

Finally, it is an object of the present invention to provide an ice fishing trap carrier that permits neat, organized storage of ice fishing traps.

These objectives are met by the device of the present invention which is adjustable, and constructed of lightweight, quick drying material that partially encloses and separates individual traps from each other. This device also incorporates a shoulder strap that enables a person to sling the enclosed traps over his or her shoulder. Concisely stated, the carrying device of the present invention includes a shoulder strap, two rectangular end pieces constructed of a durable, tear resistant, quick drying material, and at least two sizing straps. Each end piece has a plurality of pockets on its inner surface and opens along its long dimension. Such pockets are of sufficient depth and width to accommodate most ice fishing traps currently available. These two end pieces are oriented such that the openings of the pockets are opposed to each other. In use, one end of a trap inserted into a pocket in an end piece of the carrier. The opposite end of the trap is then inserted in the opposing pocket of the other end piece. When closed for transport, the end pieces are rolled longitudinally—i.e., in a direction perpendicular to the openings of the pockets.

Once the desired number of traps is so placed in the pockets, the device is rolled or folded in a direction perpendicular to the long dimension of the traps, such that after rolling, the inner surfaces of the end pieces face inwards. To prevent unrolling, fastening straps attached to the outer surface of each end piece are secured by means including, but not limited to Velcro®-type hook-and-loop fasteners, a tie, or snaps. Additional pockets may be located on the outer surfaces of the end pieces for storing ice fishing accessories.

The two end pieces are connected to each other by a number of sizing straps. The sizing straps limit the length of the carrier and provide a means of compression, thereby holding the traps securely within the pockets. The sizing straps also serve the purpose of aligning the pocket openings in the end pieces opposite each other. The sizing straps may be fabricated from an elastic material; at any event, their effective length may be adjustable so that the carrying device can accommodate traps of different sizes.

The shoulder strap of the trap carrier is affixed to and extends between the end pieces, and may be constructed of a durable, tear resistant, quick drying material having sufficient strength to bear the weight of both the device and the traps. The shoulder strap is adjustable and of sufficient length to permit the user to comfortably sling the carrying device over his or her shoulder. In general, it can be detached from the end pieces in order to configure the carrying device for easy storage.

Unlike the prior-art trap carriers, the carrier of the present invention can be easily stored once the traps have been removed. Because it is constructed from fabric, the device, once emptied, can be easily rolled or folded to be stored in a box or bucket, an ice fishing shanty, or a vehicle.

DETAILED DESCRIPTION OF THE PREFERRED EMBODIMENT

Figure 1:
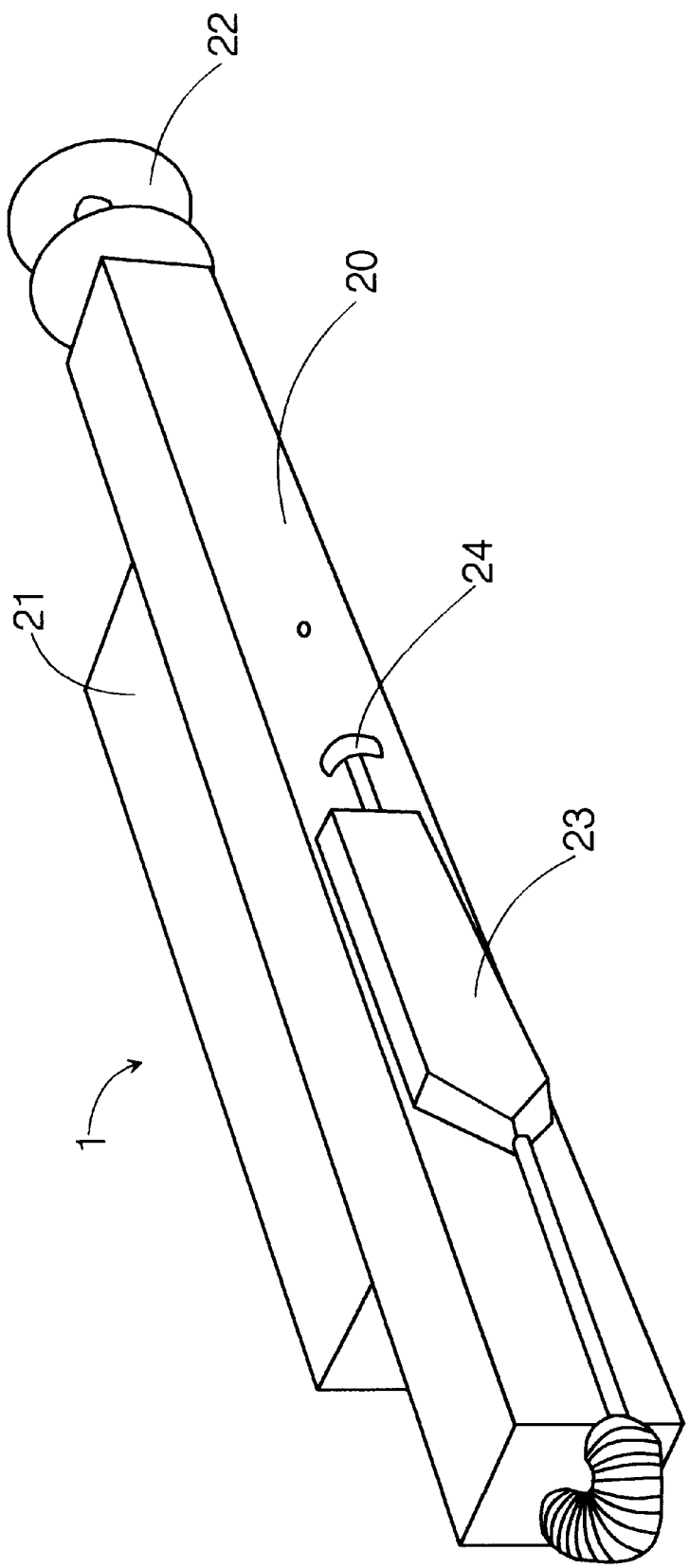
FIG. 1 is a perspective view of a prior-art ice fishing trap.

An ice fishing trap 1 that is representative of the prior art is shown in FIG. 1 configured for transport and storage. The trap 1 typically consists of a first wooden stick 20 and a second wooden stick 21, pivotally connected at approximately their midpoints, a reel 22 attached to one end of the first wooden stick 20, and a spring loaded signal flag 23 attached to the opposite end of the first wooden stick 20. For storage and transport, the signal flag 23 can be held against the body of the first wooden stick 20 by means of a retaining device 24, such as a hook.

Figure 2:
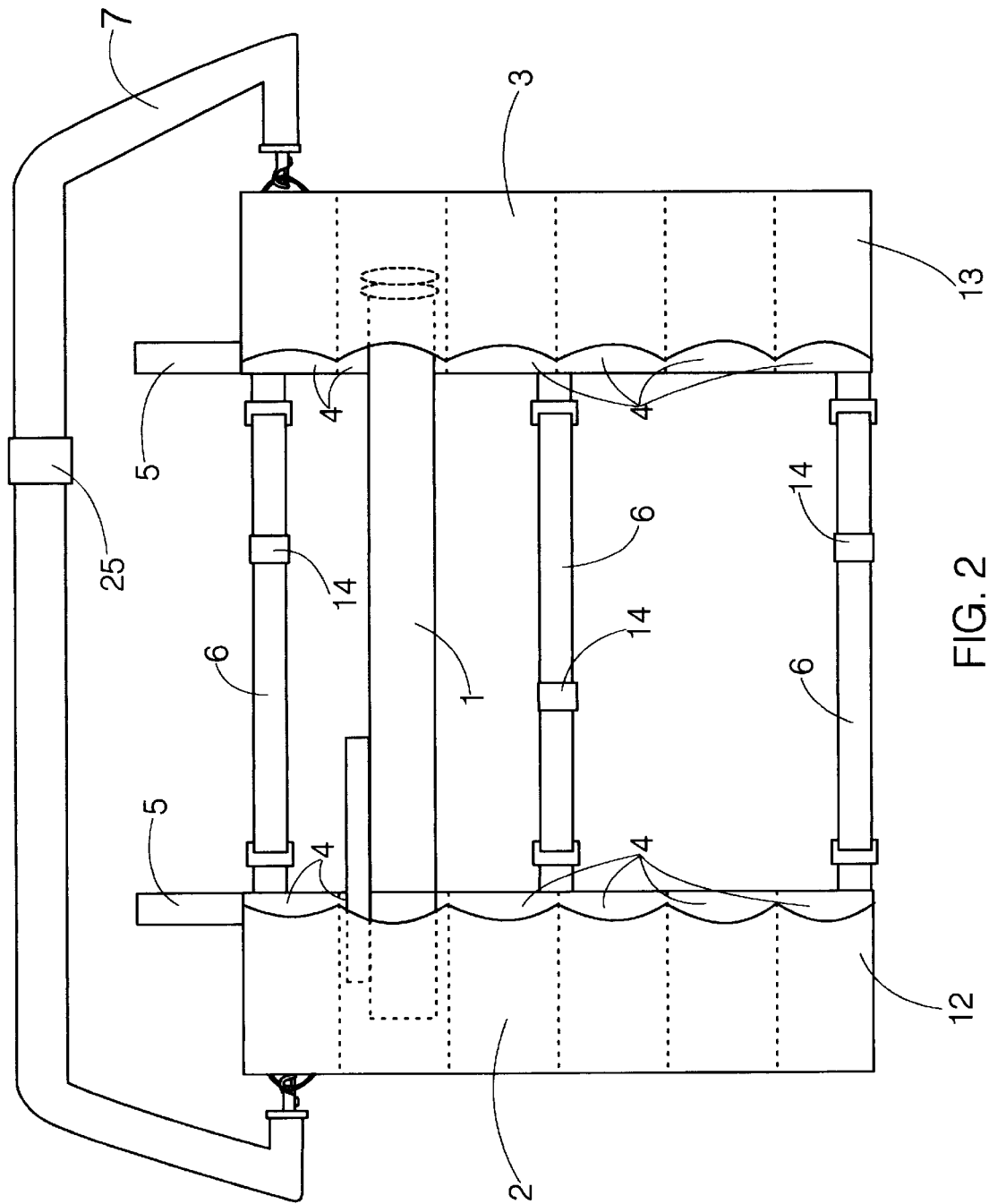
FIG. 2 is view of the device in accordance with the Preferred Embodiment of the invention, showing the inner surfaces of the end pieces.
Figure 3:
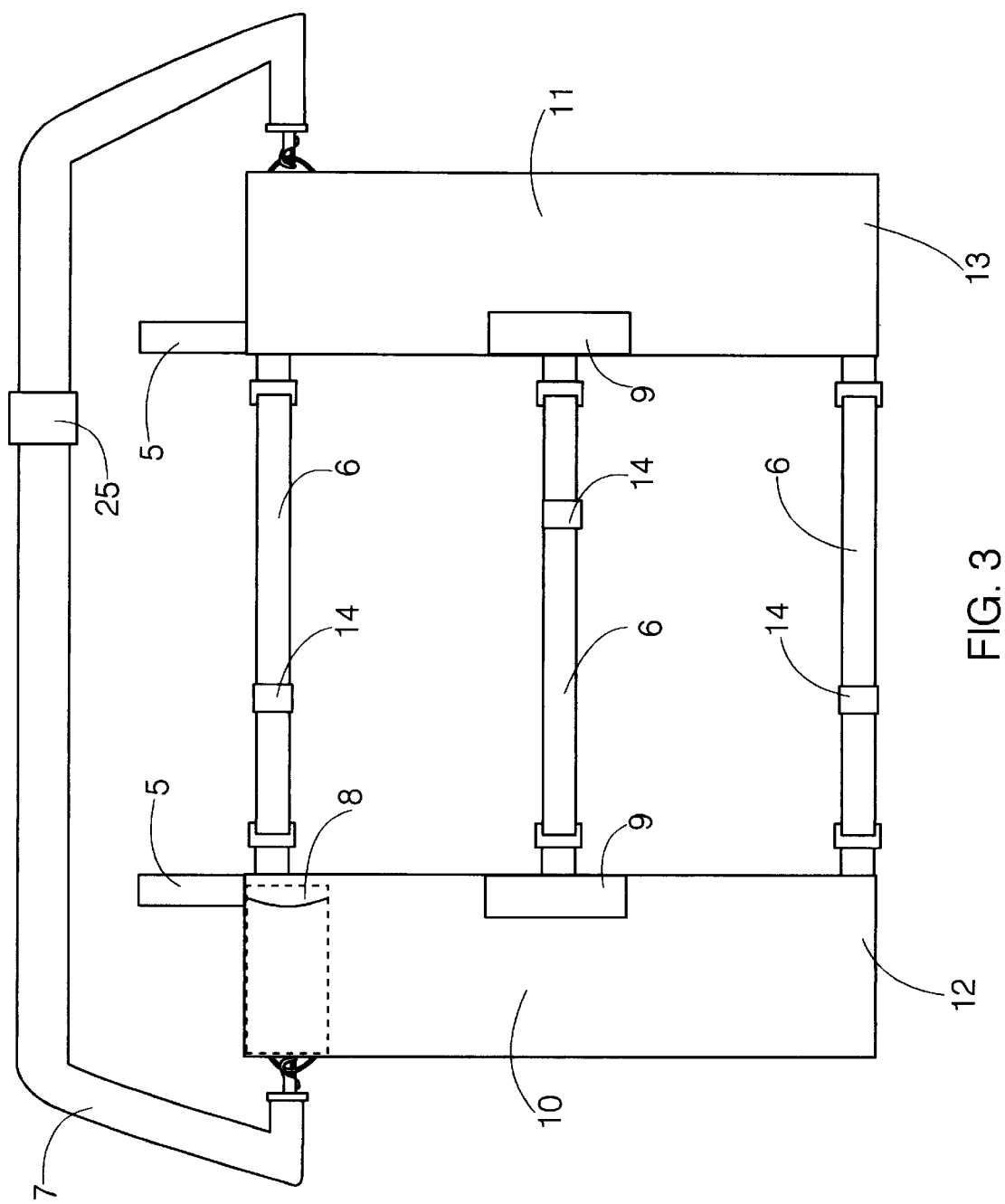
FIG. 3 is view of the device in accordance with the Preferred Embodiment of the invention, showing the outer surfaces of the end pieces.

An ice trap carrier of the present invention is shown in FIGS. 2 and 3. The device includes a first end piece 12 and a second end piece 13, connected to each other by sizing straps 6, and a detachable shoulder strap 7. The end pieces 12 and 13 are fabricated from a durable, tear resistant, quick-drying material, which, in the Preferred Embodiment, is nylon. In the Preferred Embodiment, the sizing straps 6 are fabricated from an elasticized material, the effective length of each of the sizing straps 6 being adjustable by means of a sizing buckle 14 to permit the carrying device to accommodate traps of different sizes. In the Preferred Embodiment, three sizing straps 6 are employed, although the actual number included in any particular embodiment of the invention is ultimately determined by the number needed to prevent the end pieces from inadvertently separating and allowing the traps to fall out of the carrier. The shoulder strap 7 is constructed of a durable, tear resistant, quick-drying material having sufficient strength to bear the weight of both the device and the traps. In the Preferred Embodiment, the length of the shoulder strap 7 can be adjusted by means of a shoulder strap buckle 25 to permit the user to easily sling the device over his or her shoulder. In the Preferred Embodiment, the shoulder strap 7 is detachable from the end pieces 12 and 13 for ease of storage. The locations of the shoulder strap 7 and sizing straps 6 on the end pieces 12 and 13 in the Preferred Embodiment are shown in FIG. 2.

End pieces 12 and 13 in the Preferred Embodiment have a plurality of similar pockets 4 on their respective inner surfaces 2 and 3. The pockets 4 are of sufficient depth and width to accommodate most ice fishing traps currently available. When the end pieces 12 and 13 are laid flat, the openings of the pockets 4 on the first end piece 12 are positioned opposite the openings of the pockets 4 on the second end piece 13. In the Preferred Embodiment, elasticized material is sewn into the openings of the pockets 4, allowing the mouth of the pocket to contract around a trap 1 inserted therein. In the Preferred Embodiment, each end piece 12 and 13 has six pockets 4, although the actual number of usable pockets in any embodiment is ultimately limited by the number of traps which a user can comfortably carry.

As shown in FIG. 2, one end of a trap 1 is inserted into a pocket 4 located on the inner surface 2 of the first end piece 12. The opposite end of the trap 1 is then inserted in the corresponding pocket 4 in the second end piece 13. Using sizing buckles 14, the sizing straps 6 are adjusted to limit the separation between the first end piece 12 and the second end piece 13 and to provide a means of compression, thereby holding the trap 1 securely within the carrier.

Figure 4:
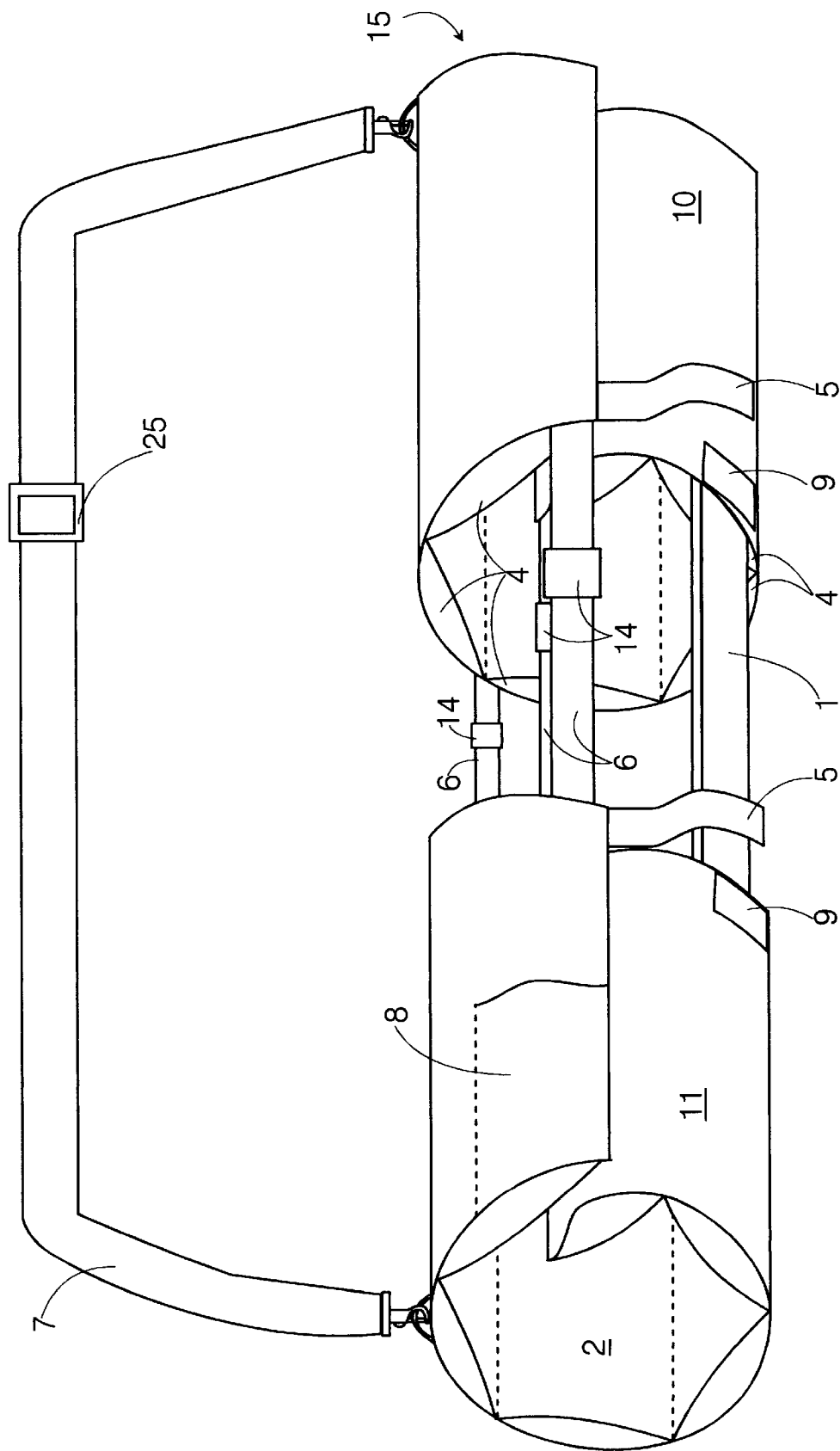
FIG. 4 is view of the device in accordance with the Preferred Embodiment of the invention, showing the carrying device ready for use to transport traps.

Once the desired number of traps is so placed in the pockets 4, the end pieces 12 and 13 are rolled or folded in a direction perpendicular to the long dimension of the traps 1, such that the inner surfaces 2 and 3 of the respective end pieces 12 and 13 face inwards to form a roughly cylindrical shape. To prevent unrolling of the end pieces 12 and 13 during transport or storage, fastening straps 5 are attached to the outer surfaces 10 and 11 of the respective end pieces 12 and 13 and are fastened. In the Preferred Embodiment, the fastening straps 5 are secured by Velcro® hook-and-loop fasteners 9 attached to the outer surfaces 10 and 11 of the respective end pieces 12 and 13. In FIG. 4, the end pieces 12 and 13 are shown rolled into a cylindrical shape 15, after ice fishing traps have been placed within the pockets 4 located on the inner surfaces 2 and 3 of the respective end pieces 12 and 13.

In the Preferred Embodiment, an additional pocket 8 is located on the outer surface 11 of the first end piece 12 for storing ice fishing accessories. FIG. 3 shows the preferred location of the additional pocket 8, fastening straps 5, and the fasteners 9.

Figure 5:
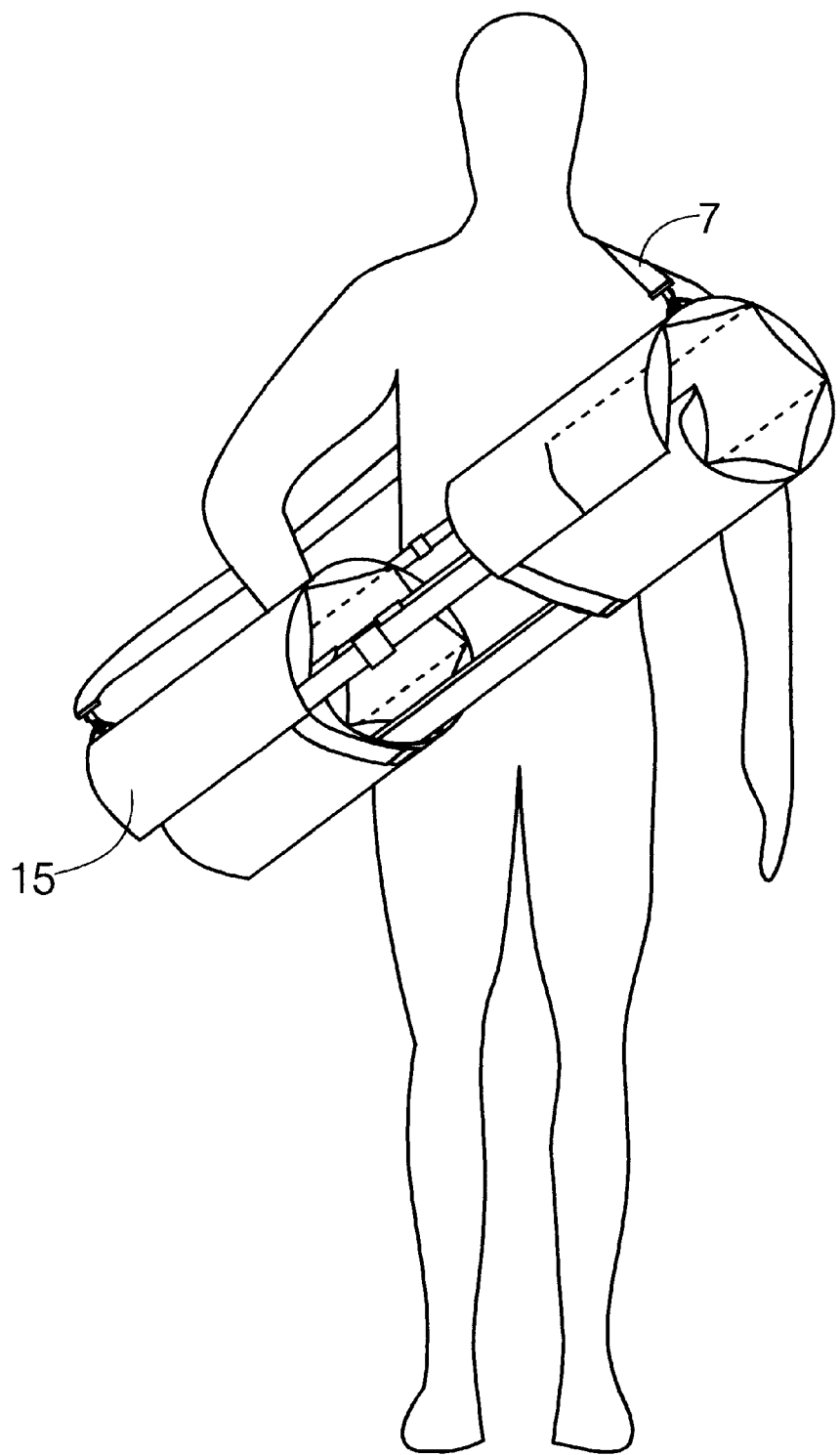
FIG. 5 is a view of an expected method for carrying the traps using the claimed invention.

FIG. 5 shows the device being used to transport ice fishing traps. The shoulder strap 7 is attached to the cylindrically rolled device 15. The shoulder strap 7 is slung over the user's shoulder such that the cylindrically rolled device 15 is carried behind the him or her. The user's hands are thus left free and unobstructed to perform other tasks.

It should be understood that the Preferred Embodiment of the invention described herein is merely illustrative of the present invention. Numerous variations and equivalents in design and use of the present invention may be contemplated without straying form the intended scope and field of the invention herein disclosed.

I claim:

1. A carrier for a plurality of ice fishing traps, said carrier comprising:
   a) a first end piece having a first outer surface and a first inner surface, said first inner surface having a first plurality of pockets disposed thereon, wherein each of said first plurality of pockets has a rim forming an opening capable of receiving an end of one of said ice fishing traps;
   b) a second end piece connected to said first end piece by a plurality of sizing straps, said second end piece having a second outer surface and a second inner surface, said second inner surface having a second plurality of pockets disposed thereon, wherein each of said second plurality of pockets has a rim forming an opening capable of receiving an opposite end of one of said ice fishing traps, wherein each opening of said second plurality of pockets is opposite one of said openings of said first plurality of pockets;
   c) a first fastening means disposed on said first outer surface;
   d) a second fastening means disposed on said second outer surface; and
   e) a shoulder strap, said shoulder strap having a first end detachably coupled to said first outer surface and a second end detachably coupled to said second outer surface.

2. The carrier as claimed in claim 1 wherein said first end piece, said second end piece, and said shoulder strap are manufactured from a tear-resistant, quick-drying fabric.

3. The carrier as claimed in claim 1 further comprising at least one outer pocket, said outer pocket being disposed on either one of said first outer surface and said second outer surface.

4. The carrier as claimed in claim 1 wherein said first fastening means and said second fastening means both comprise hook-and-loop fasteners.

5. The carrier as claimed in claim 1 wherein said sizing straps are elastic.

6. The carrier as claimed in claim 1 wherein each of said sizing straps has an adjustable length.

7. The carrier as claimed in claim 1 wherein said shoulder strap has an adjustable length.

8. The carrier as claimed in claim 1 wherein each of said rims of said first plurality of pockets is elasticized.

9. The carrier as claimed in claim 1 wherein each of said rims of said second plurality of pockets is elasticized.

10. An ice trap carrier comprising:
    a) a first end piece having a first outer surface, said first outer surface having a pocket disposed thereon, and a first inner surface, said first inner surface having a first set of six pockets of equal size disposed thereon, each pocket of said first set having an elasticized rim defining a pocket opening capable of receiving an end of one of said ice fishing traps;
    b) a second end piece, said second end piece being coupled to said first end by three sizing straps, said second end piece having a second outer surface and a second inner surface, said second inner surface having a second set of six pockets of equal size disposed thereon, wherein each pocket of said second set has an elasticized rim defining a pocket opening capable of receiving an opposite end of one of said ice fishing traps such that each of said pocket openings of said second set is opposite one of said pocket openings of said first set;
    c) a first fastening means disposed on said first outer surface;
    d) a second fastening means disposed on said second outer surface; and
    e) a shoulder strap having a first end detachably coupled to said first outer surface and a second end detachably coupled to said outer surface.

11. An ice trap carrier as claimed in claim 10 wherein said first end piece, said second end piece, and said shoulder strap are manufactured from nylon.

12. The carrier as claimed in claim 10 wherein said first fastening means and said second fastening means both comprise hook-and-loop fasteners.

13. The carrier as claimed in claim 10 wherein said each of said sizing straps has an adjustable length.

14. The carrier as claimed in claim 10 wherein said shoulder strap has an adjustable length.

15. A method of carrying a plurality of ice fishing traps in an ice fishing trap carrier, said method comprising the steps of:
    a) inserting a first end of an ice fishing trap in a pocket on an inner surface of a first end-piece of said carrier;
    b) inserting an opposite end of said trap in a pocket on an inner surface of a second end-piece of said carrier located opposite the pocket containing said first end of said trap;
    c) repeating steps (a) and (b) until all pockets in the first end-piece and the second end-piece are filled with ice fishing traps;
    d) rolling the carrier in a direction perpendicular to the longitudinal axes of the ice fishing traps to form a cylindrical shape;
    e) securing fasteners located on an outer surface of said first end-piece;
    f) securing fasteners located on an outer surface of said second end-piece;
    g) attaching a shoulder-strap to the outer surfaces of the first and second end-pieces; and
    h) carrying the trap by the shoulder-strap.

* * * * *